United States Patent [19]
Ono et al.

[11] Patent Number: 5,129,661
[45] Date of Patent: Jul. 14, 1992

[54] STEEL OIL RING ASSEMBLY

[75] Inventors: Sumio Ono; Hitoshi Hattori; Hatsutaro Mizuno, all of Kashiwazaki, Japan

[73] Assignee: Kabushiki Kaisha Riken, Japan

[21] Appl. No.: 785,266

[22] Filed: Oct. 30, 1991

Related U.S. Application Data

[62] Division of Ser. No. 570,772, Aug. 22, 1990, Pat. No. 5,087,055.

[30] Foreign Application Priority Data

Aug. 31, 1989 [JP] Japan .................................. 1-102151
Aug. 31, 1989 [JP] Japan .................................. 1-102152

[51] Int. Cl.$^5$ .............................................. F16J 9/06
[52] U.S. Cl. ................................ 277/141; 277/138; 277/217; 277/223
[58] Field of Search ............... 277/138, 139, 141, 217, 277/222, 223

[56] References Cited

U.S. PATENT DOCUMENTS

| | | | |
|---|---|---|---|
| 2,656,230 | 10/1953 | Phillips | 277/139 |
| 3,166,331 | 1/1965 | Warrick | 267/1.5 |
| 3,338,582 | 8/1967 | DeBruin | 277/139 |
| 3,488,060 | 1/1970 | Prasse | 277/141 |
| 3,695,622 | 10/1972 | Davis et al. | 277/139 |
| 3,929,342 | 12/1975 | Morsbach et al. | 277/141 |
| 4,606,101 | 8/1986 | Kosoki et al. | 277/139 |

Primary Examiner—William A. Cuchlinski, Jr.
Assistant Examiner—Daniel G. DePumpo
Attorney, Agent, or Firm—Finnegan, Henderson, Farabow, Garrett & Dunner

[57] ABSTRACT

A steel oil ring assembly having an upper rail, a lower rail and an annular space-expander embraced by the rails and having radially extending or axially extending corrugations. The spacer is split at one circumferential location to form abutting end portions which come into pressured contact with each other at a force point located on a plane passing through the centers of the corrugations that extends in an axial direction for radially extending corrugations and in a radial direction for axially extending corrugations. The free ends of the abutting end portions of the spacer form an opening have an angle of 10°±9° extending outwardly from the force point.

4 Claims, 7 Drawing Sheets

STEEL OIL RING ASSEMBLY

This is a division of application Ser. No. 07/570,772, filed Aug. 22, 1990 now U.S. Pat. No. 5,087,055.

BACKGROUND OF THE INVENTION

This invention relates to a steel oil ring assembly used in an internal combustion engine. More particularly, the invention relates to improvements in the shape of the abuting end portions of a spacer-expander having a corrugated shape in the radial as well as in the axial direction.

A spacer expander 10 of the type shown in FIG. 1(a) often is used in a steel oil ring assembly of the above-mentioned kind. The spacer expander 10 (hereinafter referred to simply as a "spacer") has corrugations in the radial direction and is embraced from above and below by an upper rail and a lower rail.

As shown in FIG. 1(a), the spacer 10 in a conventional steel oil ring assembly has a continuous corrugated shape in the radial direction and is formed to have an overall annular shape as seen from the axial direction. The spacer 10 is split at one location on the circumference thereof, and the split ends of the spacer 10 meet at a butt portion 11. When the spacer 10 is fitted into a separate piston and compressed by the inner wall of a cylinder, the split ends at the butt portion 11 come into pressured contact with each other in such a manner that a force point (junction point) a occupies a position considerably above a center line X-X' of the height of the spacer corrugations. As a result, the state of contact and the contact force between upper- and lower-rail abutting portions 12, 12' which project from the vicinity of the force point a and the inner peripheral surfaces of the respective upper and lower rails become non-uniform. Owing to the influence of this non-uniformity, the outer peripheral surfaces of the upper and lower rails present at the butt portion 11 assume a state in which they do not contact the cylinder wall surface correctly. This causes a reduction in the oil scraping effect of the oil ring.

Another example of a spacer according to the prior art is shown in FIG. 1(b).

As shown in FIG. 1(b), a spacer expander 110 has a corrugated shape in the axial direction and is also embraced from above and below by an upper rail and a lower rail.

The spacer 110 in this conventional steel oil ring assembly has a continuous corrugated shape in the axial direction and is formed to have an overall annular shape as seen from the axial direction. The spacer 110 is split at one location on the circumference thereof, and the split ends of the spacer 110 meet at a butt portion 111. When the spacer 110 is fitted into a piston and compressed by the inner wall of a cylinder, the split ends at the butt portion 111 come into pressured contact with each other in such a manner that the force point (juntion point) a occupies a position considerably above the center line X-X' of the height of the spacer corrugations. As a result, the state of contact and the contact force between upper- and lower-rail abutting portions 112, 112' which project from the vicinity of the force point a and the inner peripheral surfaces of the respective upper and lower rails become non-uniform. Owing to the influence of this non-uniformity, the outer peripheral surfaces of the upper and lower rails present at the butt portion 111 assume a state in which they do not contact the cylinder wall surface correctly. This causes a reduction in the oil scraping effect of the oil ring.

SUMMARY OF THE INVENTION

An object of the present invention is to provide a steel oil ring assembly in which an excellent oil scraping operation is performed by improving the position of the force point at the butt portion.

According to one aspect of the present invention, the foregoing object is attained by providing a steel oil ring assembly comprising an upper rail, a lower rail, and a spacer embraced from above and below by the upper and lower rails and having radially extending corrugations. The spacer is split at one location to form abutting ends which come into pressured contact with each other at a force point positioned on a line passing through the corrugations substantially at respective centers thereof in the radial direction. The spacer has an opening, which defines an angle of $10° \pm 9°$, extending radially outward from the force point at the abutting ends.

According to another aspect of the present invention, the foregoing object is attained by providing a steel oil ring assembly comprising an upper rail, a lower rail, and a spacer embraced from above and below by the upper and lower rails and having axially extending corrugations. The spacer is split at one location to form abutting ends which come into pressured contact with each other at a force point positioned on a line passing through the corrugations substantially at respective centers thereof in the axial direction. The spacer has an opening, which defines an angle of $10° \pm 9°$, extending upwardly from the force point at said abutting ends.

In accordance with the invention, the upper and lower rails make uniform contact with the inner wall of a cylinder over its entire circumference by virtue of the spacer. This makes it possible to improve oil scraping performance and to reduce the amount of lubricant consumed.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of a steel oil ring assembly according to the present invention will now be described with reference to the drawings.

Figure 2:
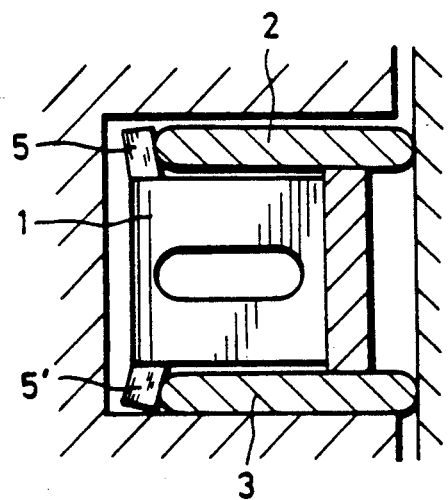
FIG. 2 is a transverse sectional view showing a spacer according to an embodiment of the present invention.
Figure 3:
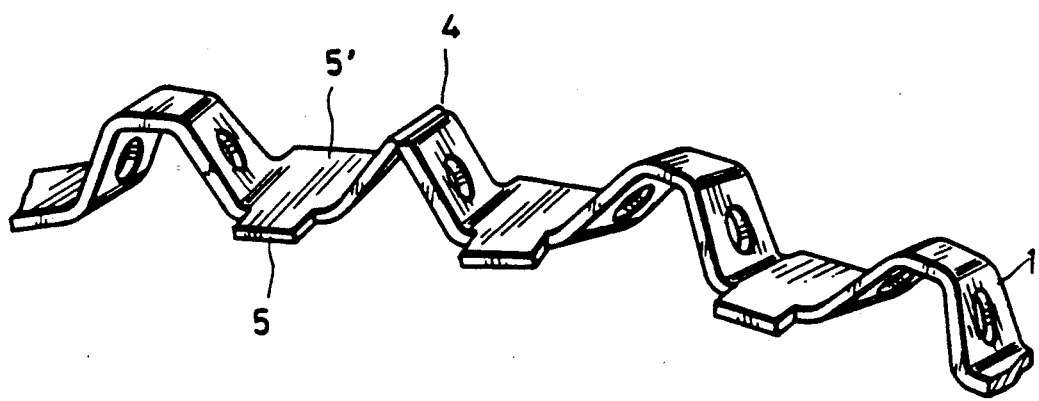
FIG. 3 is a an enlarged perspective view showing a portion of the spacer of FIG. 2.
Figure 4:
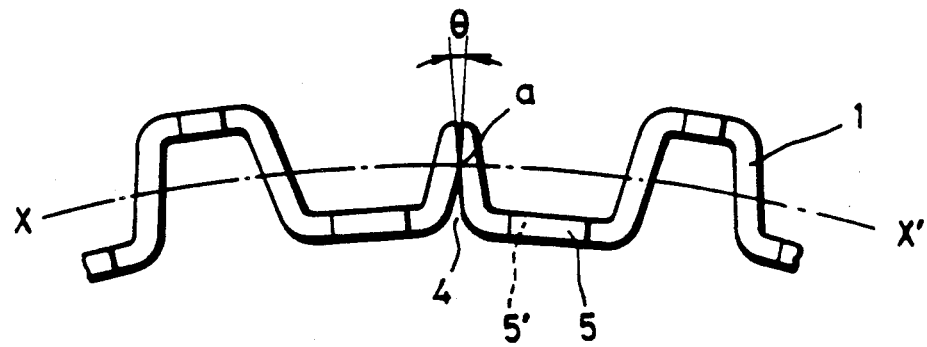
FIG. 4 is a plan view showing, in part, the spacer of FIG. 3.

As shown in FIG. 2, a steel oil ring assembly ordinarily includes a spacer-expander 1, an upper rail 2 and a lower rail 3. As illustrated in FIGS. 3 and 4, the spacer 1 is formed so that the overall shape thereof is annular as seen from the axial direction, and the spacer is split at one location on the circumference thereof to form abutting end portions 4 (also referred to as a "rafter" portion owing to its shape as seen from the vertical direction). Projections 5, 5' are fomred on upper and lower portions, respectively, of the spacer 1 on the inner periphery thereof. Owing to the projections 5, 5', the upper and lowr rails 2, 3 are urged toward the outer circumferential direction so as to press against the wall of a cylinder.

In accordance with the invention, and as shown in FIG. 4, the shape of the abutting end portions 4 is such that the force point a (junction point) is situated on the center line X-X' of the corrugations of the spacer 1 in the radial direction. In other words, point a is located in an axially extending annular plane that passes through the centers of the corrugations. The free ends of the abutting end portions 4 form an opening of angle $\theta$ in the outer circumferential direction. The angle $\theta$ is formed by grinding or plastic working, and a suitable range of values thereof is $10° \pm 9°$. The lower limit of $1°$ is a minimum value for which the opening can be maintained in terms of manufacture, and this suggests that the force point a will not lie above the center line X-X'. The upper limit of $19°$ is the boundary value for which stable contact can be obtained at the force point a in a state where a compressing force acts upon the spacer 1 when the spacer is fitted in the piston and inserted in the cylinder. This is also the boundary value at which burrs will not develop at the ends of the portions 4.

Figure 1A:
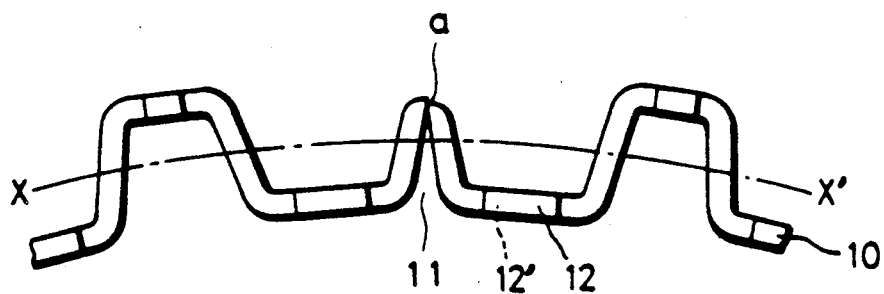
FIGS. 1(a) and 1(b) are enlarged plan views showing, in part, examples of spacers according to the prior art.

The steel oil ring assembly of this embodiment (FIG. 4) and the steel oil ring assembly of the prior art [FIG. 1(a)] were tested in a four-cycle gasoline engine in which the inner diameter of the cylinder was 76 mm. The results of the test will now be described.

Figure 5:
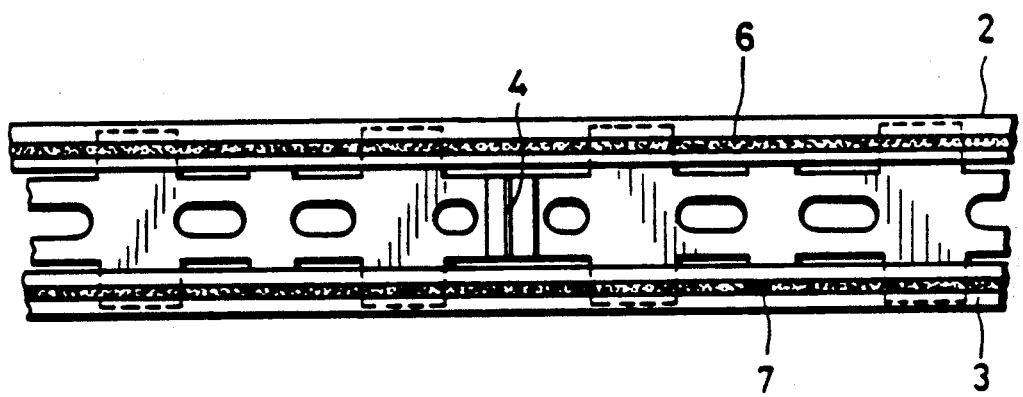
FIG. 5 is an enlarged front view illustrating the results of testing a steel oil ring assembly according to the embodiment of the invention.
Figure 6:
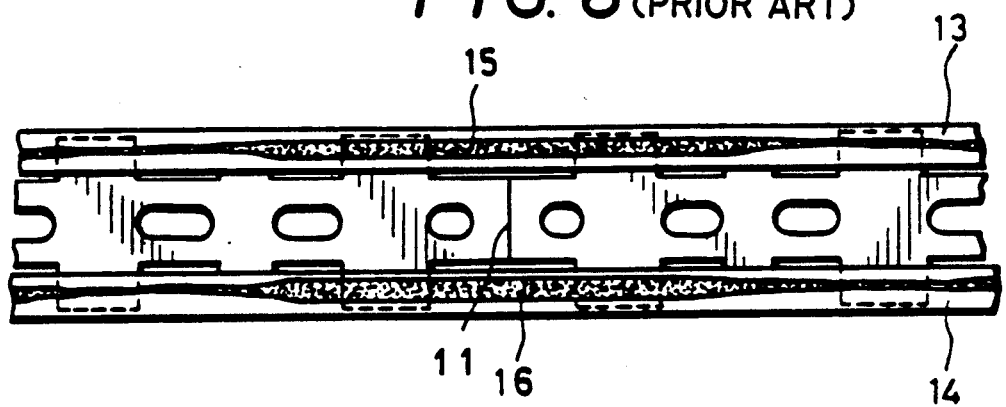
FIG. 6 is an enlarged front view illustrating the results of testing a steel oil ring assembly according to the prior art.

Oil ring assemblies of this embodiment were finished by a dry-type grinding machine to give the angle $\theta$ between the free ends of the abutting end portions 4 a value of $8° \pm 1$ . FIGS. 5 and 6 show the states of the outer circumferential surface of the upper and lower rails in the vicinity of the spacer butt portion of above-mentioned oil rings released after eight hours of a test run under the same conditions.

The results of the test applied to the present embodiment confirm that contact tracks 6, 7, which are left on the outer circumferences of the upper rail 12 and lower rail 3 owing to contact with the cylinder wall, have a substantially uniform width over the entire circumference, as illustrated in FIG. 5.

By contrast, as a result of the test applied, to the prior-art example of FIG. 1(a), contact tracks 15, 16 of the kind shown in FIG. 6 are left on the outer circumference of an upper rail 13 and lower rail 14 owing to contact with the cylinder wall. These contact tracks 15, 16 are wide on both the upper and lower rails 13, 14 in the vicinity of the abutting end portions 11 but become narrower on the same rails between the two corrugations adjacent to the abutting end portions on either side thereof.

Figure 7:
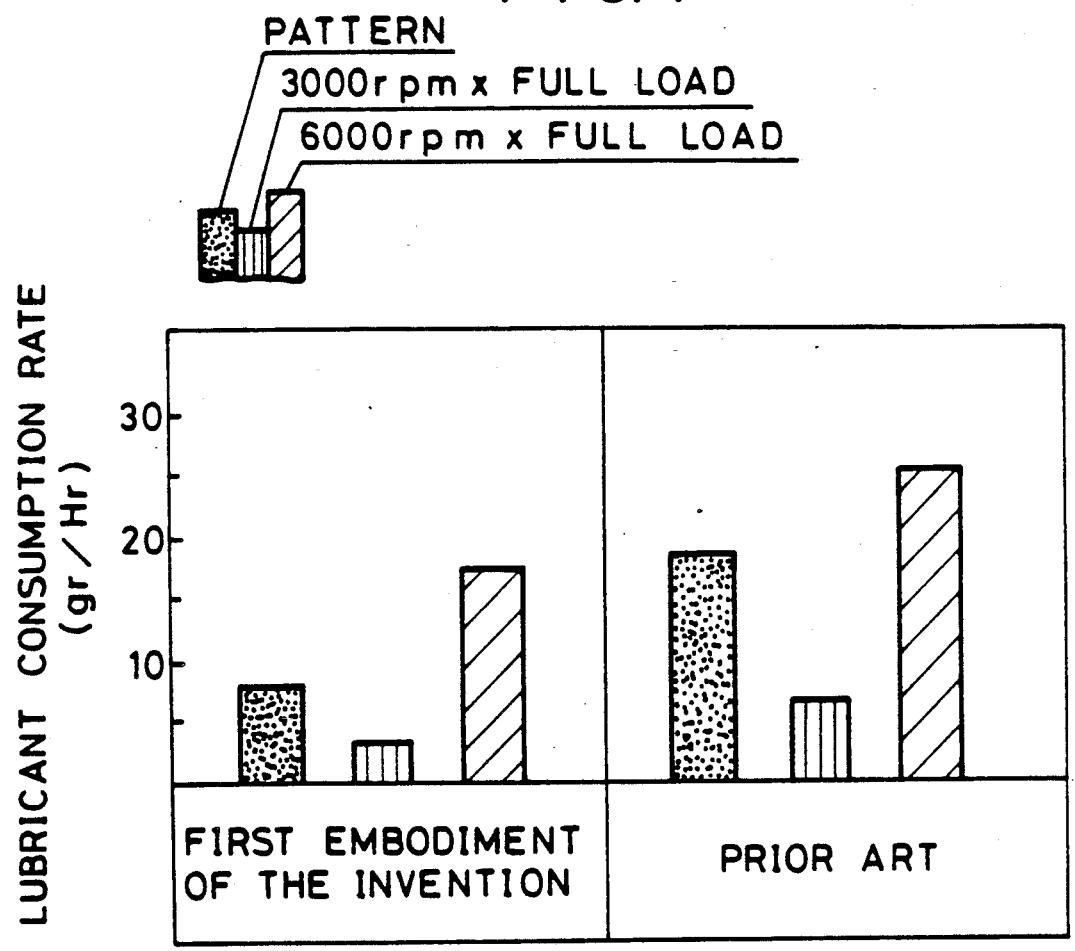
FIG. 7 is a diagram showing test data illustrating the results of testing a steel oil ring assembly according to an embodiment of the invention and a steel oil ring assembly according to the prior art.

Further, FIG. 7 illustrates lubricant consumption obtained under three types of test conditions in a test applied after the engine test run. The differences between the present invention and the prior art are clearly shown. It was verified that both the upper and lower rails 2, 3 of the oil ring assembly of the present embodiment made uniform contact with the cylinder wall and exhibited an excellent oil scraping effect.

Thus, in accordance with this embodiment of the invention as described above, the upper and lower rails both contact the cylinder wall correctly and uniformly. As a result, the oil-scraping performance is improved and the amount of lubricant consumed can be reduced considerably in comparison with the prior art.

A second embodiment of a steel oil ring assembly according to the present invention will now be described with reference to FIGS. 8 through 12.

Figure 8:
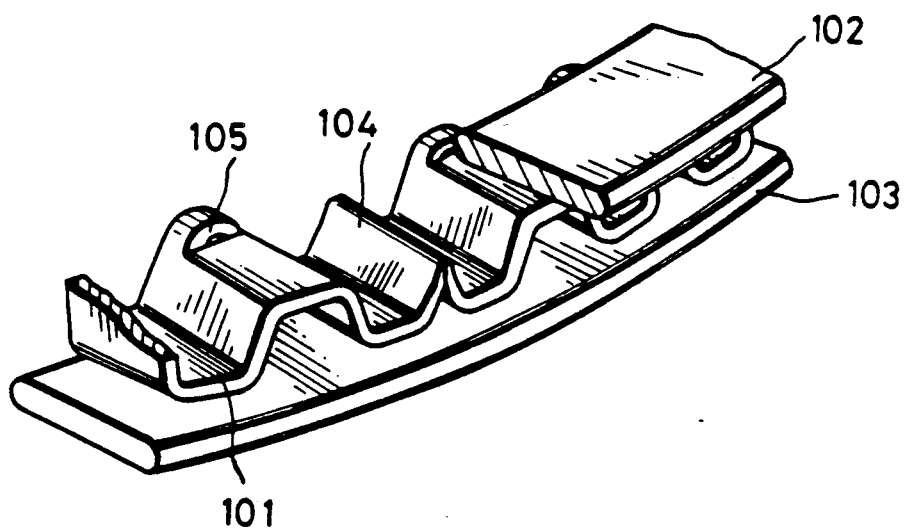
FIG. 8 is an enlarged perspective view showing a portion of a spacer according to a second embodiment of the present invention.
Figure 9:
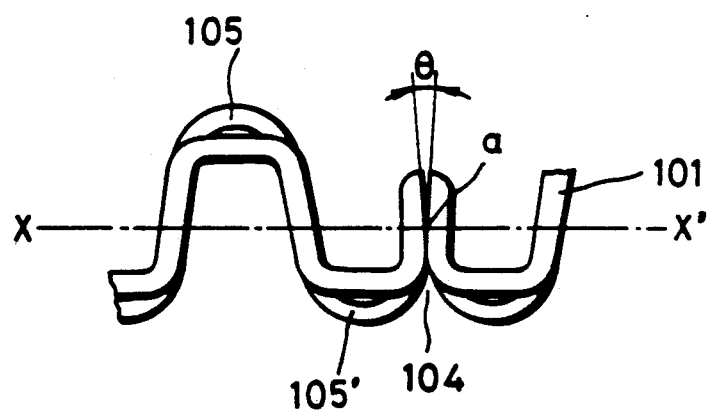
FIG. 9 is an enlarged front view showing a portion of the spacer of FIG. 8.

As shown in FIG. 8, a steel oil ring assembly ordinarily includes a spacer 101, an upper rail 102 and a lower rail 103. As illustrated in FIG. 9, the spacer 101 is formed so that the overall shape thereof is annular as seen from the axial direction, and the spacer is split at one location on the circumference thereof to form abutting end portions 104. Projections 105, 105' are formed on upper and lower portions, respectively, of the spacer 101 on the inner periphery thereof. Owing to the projections 105, 105', the upper and lower rails 102, 103 are urged toward the outer circumferential direction so as to press against the wall of a cylinder, not shown. In this embodiment the corrugations run in an axial direction whereas in the previous embodiment they ran in a radial direction.

The shape of the abutting end portions 104 is such that a force point a (junction point) is situated on the center line X-X' of the corrugations of the spacer 101 in the axial (vertical) direction. In other words, line X-X' is a plane extending in a radial direction that passes through the centers of the corrugations. The free ends of the abutting end portions 104 have an upwardly directed opening of angle $\theta$. The angle $\theta$ is formed by griding or plastic working, and a suitable range of values thereof is $10° \pm 9°$. The lower limit of $1°$ is a minimum value for which the opening can be maintained in terms of manufacture, and this suggests that the force point a will not lie above the center line X-X'. The upper limit of $19°$ is the boundary value for which stable contact can be obtained at the force point a in a state where a compressing force acts upon the spacer 101 when the spacer is fitted in the piston and inserted in the cylinder. This is also the boundary value at which burrs will not develop at the ends between the free ends of the abutting end portions; 104.

Figure 1B:
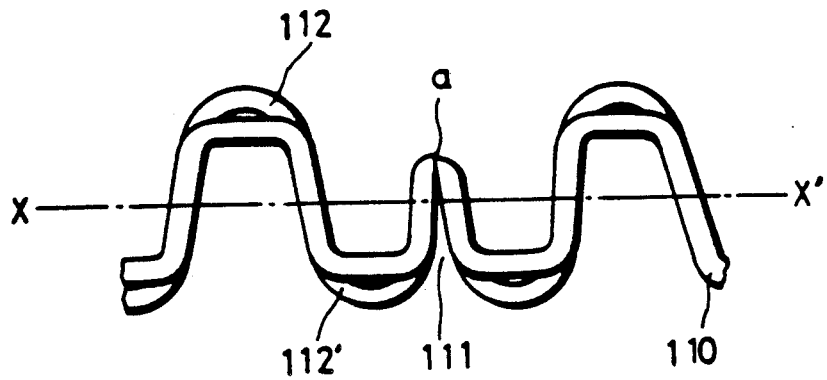

The steel oil ring assembly of this embodiment (FIG. 9) and the steel oil ring assembly of the prior art [FIG. 1 (b)] were tested in a four-cycle gasoline engine in which the inner diameter of the cylinder was 76 mm. The results of the test will now be described.

Figure 10:
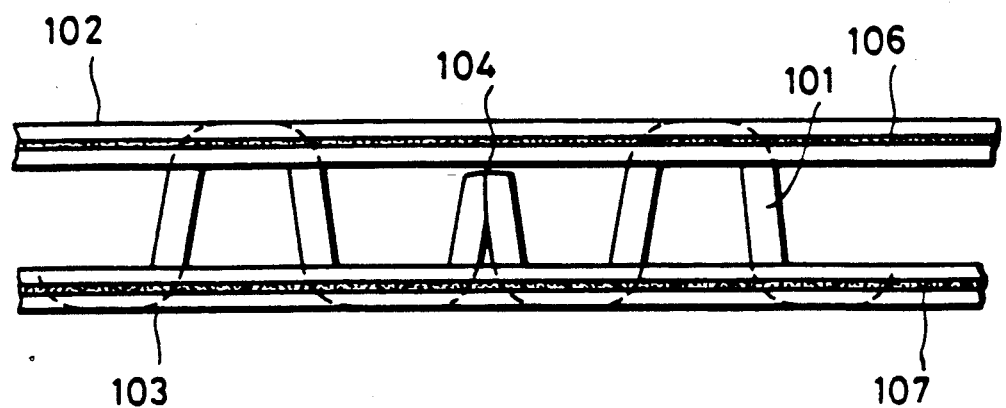
FIG. 10 is an enlarged front view illustrating the results of testing a steel oil ring assembly according to the second embodiment of the invention.
Figure 11:
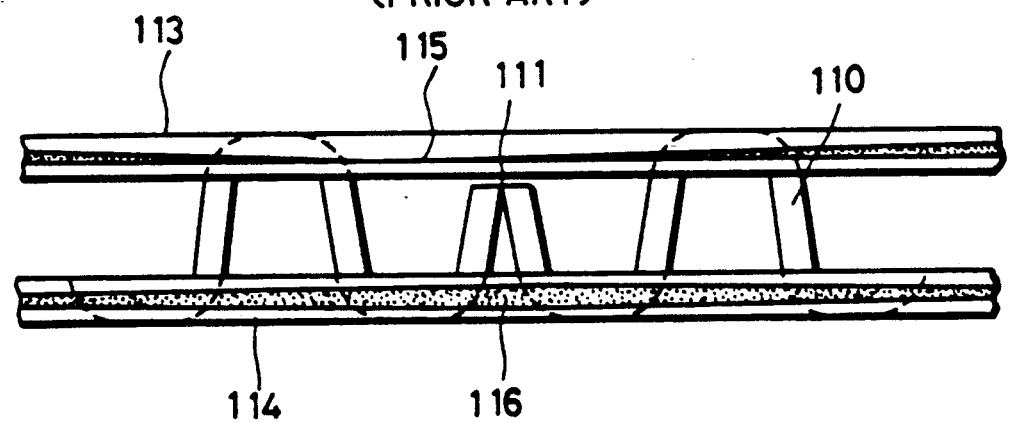
FIG. 11 is an enlarged front view illustrating the results of testing a steel oil ring assembly according to the prior art.

Oil ring assemblies of this embodiment were finished by a dry-type grinding machine to give the angle $\theta$ of the portions 104 a value of $8°\pm1°$. FIGS. 10 and 11 shown the states of the outer circumferential surface of the upper and lower rails in the vicinity of the spacer butt portion of abovementioned oil rings released after eight hours of a test run under the same conditions.

The results of the test applied to the second embodiment confirm that contact tracks 106, 107, which are left on the outer circumference of the upper rail 102 and lower rail 103 owing to contact with the cylinder wall, have a substantially uniform width over the entire circumference, as illustrated in FIG. 10.

By contrast, as a result of the test applied to the prior-art example of FIG. 1 (b), contact tracks 115, 116 of the kind shown in FIG. 11 are left on the outer circumference of an upper rail 113 and lower rail 114 owing to contact with the cylinder wall. The contact track, 116 is wide on the lower rail, 114 in the vicinity of the abutting end portions 11, but the contact track 115 of upper rail 113 is much narrower between the two corrugations adjacent abutting portions.

Figure 12:
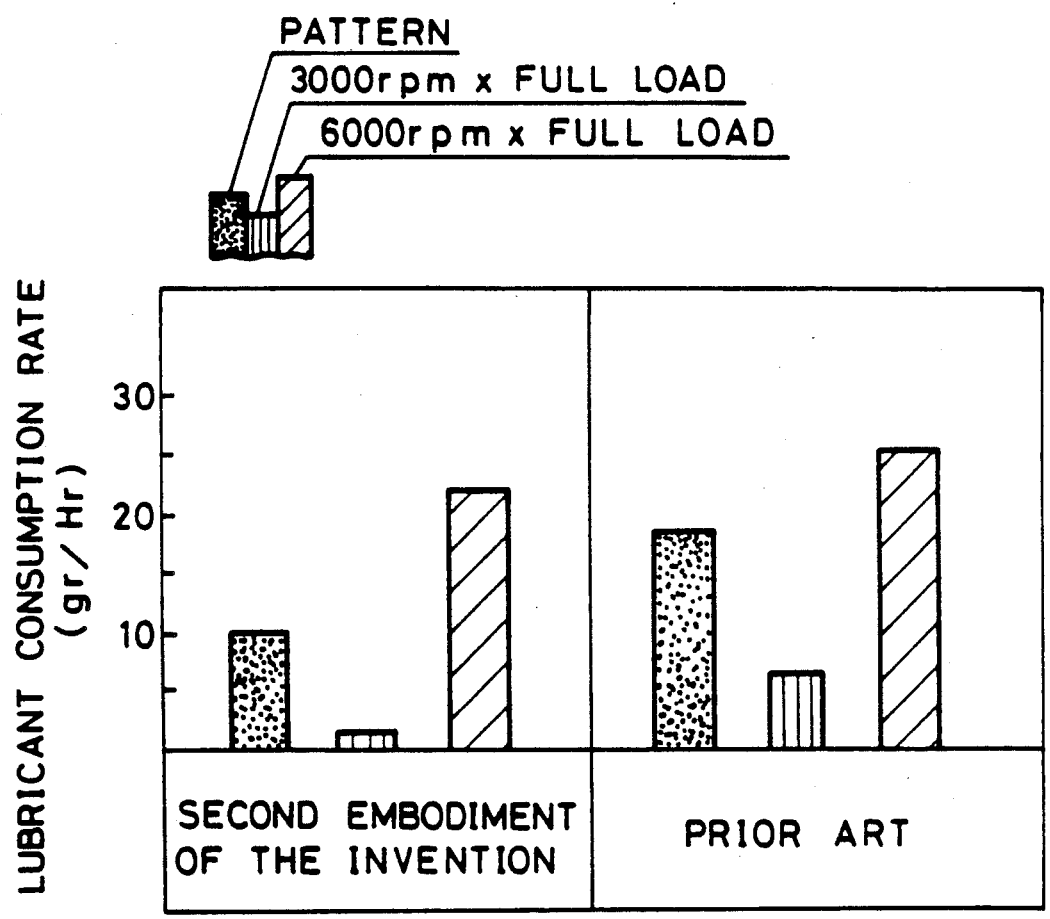
FIG. 12 is a diagram showing test data illustrating the results of testing a steel oil ring assembly according to the second embodiment of the invention and a steel oil ring assembly according to the prior art.

Further, FIG. 12 illustrates lubricant consumption obtained under three types of test conditions in a test applied after the engine test run. The differences between the present invention and the prior art are clearly shown. It was verified that both the upper and lower rails 102, 103 of the oil ring assembly of the present embodiment made uniform contact with the cylinder wall and exhibited an excellent oil-scraping effect.

Thus, in accordance with the second embodiment of the invention as described above, the upper and lower rails both contact the cylinder wall correctly and uniformly. As a result, the oil scraping performance is improved and the amount of lubricant consumed can be reduced considerably in comparison with the prior art.

As many apparently widely different embodiments of the present invention can be made without departing from the spirit and scope thereof, it is to be understood that the invention is not limited to the specific embodiments thereof except as defined in the appended claims.

What is claimed is:

1. A steel oil ring assembly comprising an upper rail, a lower rail and an annular spacer-expander having radially extending corrugations for supporting from above and below said upper and lower rails, said spacer being split at one circumferential location to form end portions, each terminating in a free end, said end portions being in pressured contact with each other at a point remote from said free ends that is located in a plane extending in axial direction that passes substantially through the centers of said corrugations in the radial direction, the free ends of said end portions diverging in an radial direction away from said point at an angle of from 1° to 19°.

2. The oil ring assembly of claim 1, wherein said free ends are shaped by grinding.

3. The oil ring assembly of claim 1, wherein said free ends are shaped by plastic working.

4. The oil ring assembly of claim 1, wherein said angle is from 7° to 90°.

* * * * *

UNITED STATES PATENT AND TRADEMARK OFFICE
CERTIFICATE OF CORRECTION

PATENT NO. : 5,129,661

DATED : July 14, 1992

INVENTOR(S) : Sumio Ono et al.

It is certified that error appears in the above-identified patent and that said Letters Patent is hereby corrected as shown below:

Claim 4, column 6, line 31, change "90°" to --9°--.

Signed and Sealed this

Seventh Day of September, 1993

Attest:

BRUCE LEHMAN

Attesting Officer

Commissioner of Patents and Trademarks